(12) United States Patent
Chen et al.

(10) Patent No.: US 8,489,218 B2
(45) Date of Patent: Jul. 16, 2013

(54) CHAMBER MATCH USING IMPORTANT VARIABLES FILTERED BY DYNAMIC MULTIVARIATE ANALYSIS

(75) Inventors: Bing-Hung Chen, Taipei County (TW); Ming-Ching Chang, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 363 days.

(21) Appl. No.: 12/905,354

(22) Filed: Oct. 15, 2010

(65) Prior Publication Data
US 2012/0095582 A1    Apr. 19, 2012

(51) Int. Cl.
*G06F 19/00*    (2006.01)
*G06Q 10/06*    (2012.01)
*G05B 19/418*    (2006.01)

(52) U.S. Cl.
CPC ...... *G06Q 10/06* (2013.01); *G05B 2219/45031* (2013.01); *G05B 19/41875* (2013.01)
USPC ............ 700/103; 700/121; 700/108; 700/110

(58) Field of Classification Search
USPC .................................. 700/103, 121, 108, 110
See application file for complete search history.

(56) References Cited

U.S. PATENT DOCUMENTS

| | | | |
|---|---|---|---|
| 6,553,332 B2 | 4/2003 | Leng | |
| 6,686,129 B2 * | 2/2004 | Chang et al. | 430/313 |
| 6,794,302 B1 * | 9/2004 | Chen et al. | 438/714 |
| 6,794,313 B1 * | 9/2004 | Chang | 438/770 |
| 6,864,174 B2 * | 3/2005 | Lin et al. | 438/689 |
| 7,109,085 B2 * | 9/2006 | Wang et al. | 438/279 |
| 7,169,625 B2 | 1/2007 | Davis et al. | |
| 7,257,457 B2 * | 8/2007 | Imai et al. | 700/121 |
| 7,373,216 B1 * | 5/2008 | Winkler et al. | 700/121 |
| 7,449,265 B1 * | 11/2008 | Dixon | 430/22 |
| 7,477,960 B2 * | 1/2009 | Willis et al. | 700/121 |
| 7,531,368 B2 * | 5/2009 | Winkler et al. | 438/5 |
| 7,596,423 B2 * | 9/2009 | Winkler et al. | 700/121 |
| 7,624,003 B2 * | 11/2009 | Yamartino | 703/6 |
| 7,650,200 B2 * | 1/2010 | Winkler et al. | 700/121 |
| 7,713,758 B2 * | 5/2010 | Yamashita et al. | 438/9 |
| 7,729,795 B2 * | 6/2010 | Winkler et al. | 700/121 |
| 7,742,177 B2 * | 6/2010 | Li et al. | 356/625 |
| 7,765,077 B2 * | 7/2010 | Yamashita et al. | 702/85 |
| 7,783,374 B2 * | 8/2010 | Winkler et al. | 700/121 |
| 7,813,895 B2 * | 10/2010 | Tallavarjula et al. | 702/182 |
| 7,842,519 B2 * | 11/2010 | Winkler et al. | 438/5 |
| 7,894,927 B2 * | 2/2011 | Funk et al. | 700/121 |

(Continued)

OTHER PUBLICATIONS

Hou, T.-H.; Su, C.-H.; and Liu, W.-L., "Parameters Optimization of a Nano-Particle Wet Milling Process Using the Taguchi Method, Response Surface Method and Genetic Algorithm", Jun. 2006, Powder Technology, vol. 173, pp. 153-162.*

(Continued)

*Primary Examiner* — Mohammad Ali
*Assistant Examiner* — Kelvin Booker
(74) *Attorney, Agent, or Firm* — Haynes and Boone, LLP

(57) ABSTRACT

The present disclosure provides a method of chamber match. The method includes identifying a golden chamber designed operable to implement a semiconductor process; identifying a reference chamber designed operable for the semiconductor process; and extracting a matching index of a processing chamber relative to the golden chamber and the reference chamber using a dynamic variable analysis.

20 Claims, 6 Drawing Sheets

U.S. PATENT DOCUMENTS

| | | | | |
|---|---|---|---|---|
| 7,899,637 | B2 * | 3/2011 | Yamashita et al. | 702/85 |
| 7,935,545 | B2 * | 5/2011 | Winkler et al. | 438/5 |
| 7,939,450 | B2 * | 5/2011 | Yamashita et al. | 438/706 |
| 7,967,995 | B2 * | 6/2011 | Funk et al. | 216/59 |
| 7,989,355 | B2 * | 8/2011 | Shieh et al. | 438/736 |
| 8,019,458 | B2 * | 9/2011 | Funk et al. | 700/121 |
| 8,024,676 | B2 * | 9/2011 | Carcasi et al. | 716/54 |
| 8,041,440 | B2 * | 10/2011 | Cheng et al. | 700/99 |
| 8,053,323 | B1 * | 11/2011 | Lin et al. | 438/303 |
| 8,101,906 | B2 * | 1/2012 | Tallavarjula et al. | 250/252.1 |
| 8,273,632 | B2 * | 9/2012 | Lin et al. | 438/303 |
| 2003/0073041 | A1 * | 4/2003 | Chang et al. | 430/313 |
| 2004/0182822 | A1 * | 9/2004 | Chen et al. | 216/67 |
| 2004/0185584 | A1 * | 9/2004 | Lin et al. | 438/9 |
| 2004/0195208 | A1 * | 10/2004 | Pavel et al. | 216/59 |
| 2005/0019961 | A1 * | 1/2005 | Davis et al. | 438/7 |
| 2005/0032386 | A1 * | 2/2005 | Chang et al. | 438/712 |
| 2005/0106888 | A1 * | 5/2005 | Chiu et al. | 438/710 |
| 2005/0199341 | A1 * | 9/2005 | Delp et al. | 156/345.24 |
| 2006/0129257 | A1 * | 6/2006 | Chen et al. | 700/96 |
| 2006/0155410 | A1 * | 7/2006 | Yamartino | 700/108 |
| 2006/0184264 | A1 * | 8/2006 | Willis et al. | 700/108 |
| 2007/0095789 | A1 * | 5/2007 | Davis et al. | 216/59 |
| 2008/0021585 | A1 * | 1/2008 | Cheng et al. | 700/110 |
| 2008/0063810 | A1 * | 3/2008 | Park et al. | 427/569 |
| 2008/0241969 | A1 * | 10/2008 | Winkler et al. | 438/5 |
| 2008/0241970 | A1 * | 10/2008 | Winkler et al. | 438/5 |
| 2008/0241971 | A1 * | 10/2008 | Winkler et al. | 438/5 |
| 2008/0243294 | A1 * | 10/2008 | Winkler et al. | 700/121 |
| 2008/0243295 | A1 * | 10/2008 | Winkler et al. | 700/121 |
| 2008/0243297 | A1 * | 10/2008 | Winkler et al. | 700/121 |
| 2008/0311687 | A1 * | 12/2008 | Yamashita et al. | 438/9 |
| 2009/0030632 | A1 | 1/2009 | Tallavarjula et al. | |
| 2009/0081815 | A1 * | 3/2009 | Yamashita et al. | 438/9 |
| 2009/0082983 | A1 * | 3/2009 | Yamashita et al. | 702/83 |
| 2009/0112520 | A1 * | 4/2009 | Lymberopoulos et al. | 702/184 |
| 2009/0177311 | A1 * | 7/2009 | Winkler et al. | 700/121 |
| 2009/0187383 | A1 * | 7/2009 | Li et al. | 702/191 |
| 2009/0242513 | A1 * | 10/2009 | Funk et al. | 216/67 |
| 2010/0036514 | A1 * | 2/2010 | Funk et al. | 700/103 |
| 2010/0036518 | A1 * | 2/2010 | Funk et al. | 700/121 |
| 2010/0080822 | A1 * | 4/2010 | Xiao | 424/195.15 |
| 2010/0203734 | A1 * | 8/2010 | Shieh et al. | 438/706 |
| 2012/0091097 | A1 * | 4/2012 | Chen et al. | 216/59 |
| 2012/0108046 | A1 * | 5/2012 | Lin et al. | 438/585 |

OTHER PUBLICATIONS

Spanos, C.J., "EE290H-Special Issues in Semiconductor Manufacturing", Fall 2005, University of California, Berkeley, Department of Electrical Engineering and Computer Science, Retrieved from the Internet on Nov. 8, 2012 at "www.inst.eecs.berkeley.edu".*

Spanos, C.J. and Poolla, K., "EE290H-Special Issues in Semiconductor Manufacturing", Fall 2003, University of California, Berkeley, Department of Electrical Engineering and Computer Science, Retrieved from the Internet on Nov. 8, 2012 at "www.inst.eecs.berkeley.edu".*

* cited by examiner

CHAMBER MATCH USING IMPORTANT VARIABLES FILTERED BY DYNAMIC MULTIVARIATE ANALYSIS

BACKGROUND

In semiconductor technologies, integrated circuit (IC) are formed in semiconductor substrates through various manufacturing steps, including lithography patterning, etching, deposition, ion implantation, and annealing. More particularly, the lithography patterning includes spin coating, baking exposure, post exposure baking, and developing. The etching includes dry etching and wet etching with different chemicals designed to effectively and selectively remove a certain material relative to a patterned mask layer. The deposition includes chemical vapor deposition, sputtering, atomic layer deposition, thermal oxidation, and plating. The ion implantation is designed to introduce impurities to a semiconductor substrate.

In semiconductor manufacturing, various processes, such as etching, deposition, implantation, and annealing, are performed in various processing tools, respectively. For example, a sputtering tool is designed to perform a sputtering deposition. Furthermore, a semiconductor manufacturer includes a plurality of processing tools of the same type designed to perform the same type process, such as sputtering deposition. It is expected that the plurality of processing tools match with each other such that the processing deviations among the processing tools are within a certain tolerable range.

Currently, there is no quantitative and systematic method for tool hardware match. The existing methods are not capable of exploring nonlinear relations among parameters and are even based on the intuitions. Especially, the tool match is more challenging when the semiconductor industry proceeds to advanced technology nodes. Accordingly, it would be desirable to provide a system and a method of tool match absent the disadvantages discussed above.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
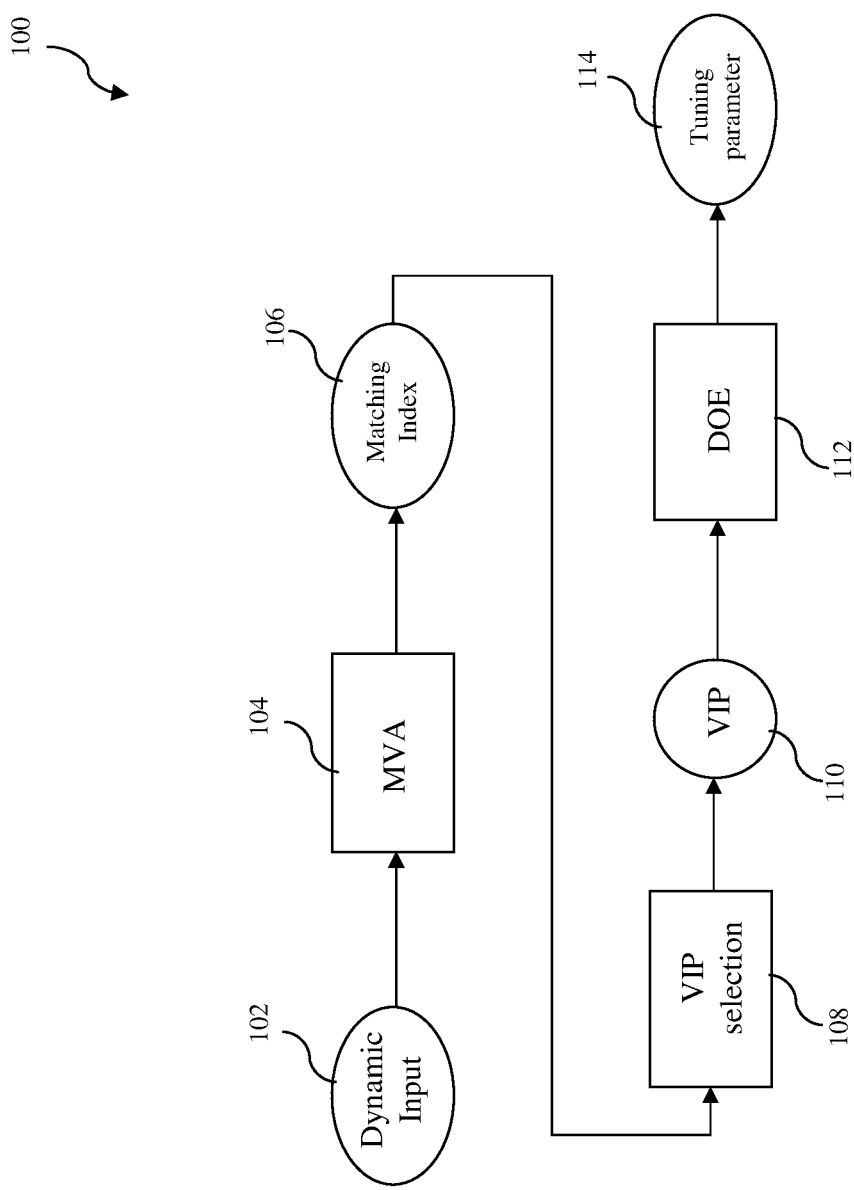
FIGS. 1 through 5 are flow diagrams of a method for chamber matching in accordance with various embodiments of the present disclosure.

It is to be understood that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. A novel method and system for chamber match are provided and described below with various examples, embodiments, variations, and descriptions.

A semiconductor manufacturer (semiconductor fab.) includes various processing tools. A processing tool is designed to perform a semiconductor process on various semiconductor substrate (e.g., wafers) for integrated circuits (IC) fabrication. For examples, an etching tool is designed to perform an etching process. An ion implantation tool is designed to perform an ion implantation.

The semiconductor manufacturer is thus equipped to be capable of performing various semiconductor processes including plasma etching, wet etching, physical vapor deposition (PVD or sputtering), chemical vapor deposition (CVD), ion implantation, plating, photoresist coating, photoresist exposure, and thermal annealing. Each semiconductor process is implemented in a proper processing tool or a processing chamber. In various examples, an etching process is implemented in an etching tool; a PVD process is implemented in a PVD tool; and an annealing process is implemented in an annealing tool.

Usually, the semiconductor manufacturer includes more than one processing tools being capable of implementing a certain semiconductor process, increasing the manufacturing throughput and reducing the cycling time. For example, the semiconductor manufacturer includes multiple etching tools. In various embodiments, the etching tools can be the same type or different type such as different models or different makers. In one embodiment, one etching tool includes only one etching chamber where an etching process is performed on a wafer. In another embodiment, an etching tool includes multiple etching chambers designed and configured similarly for etching. In yet another embodiment, an etching tool includes multiple etching chambers designed or configured differently for different etching processes. Various etching chambers designed and configured for an etching process, either in the same etching tool or from different etching tools, are collectively referred to as etching chambers.

In IC fabrication, substrates (such as wafers) are distributed to various etching chambers for the same etching process (such as polysilicon gate etching) are expected to have the same etching result in compliance with the specification. However, the variations can happen due to various factors, chamber characteristics, hardware settings, and chamber etching condition drifting. Those variations are referred to as chamber mismatch. When the chamber mismatch is beyond a tolerable range, the processed wafers may be scrapped or have a degraded yield or quality. The chamber mismatch needs to be identified and fixed such that those etching chambers are matched within the tolerable range. Generally, the chamber mismatch can happen to various other semiconductor processes, including both front end and backend processes, such as ion implantation, CVD, PVD, annealing, plating, and coating.

FIG. 1 is a flow diagram of a method 100 for chamber match in accordance with one embodiment of the present disclosure. The method 100 is designed to provide an effective approach for monitoring chamber mismatch and to provide an effective procedure to fix the chamber mismatch. Referring to FIG. 1, the method 100 is described in detail using an exemplary processing chamber.

The method 100 includes dynamic input at block 102 for collecting manufacturing data. The manufacturing data include various manufacturing parameters associated with the processing chamber. In one embodiment, the manufacturing data includes hardware parameter data of the processing chamber. For example, the hardware parameter data include hardware setting data (or tool data), such as a spacing between the target and the substrate in a sputtering chamber. The hardware parameter data can be directly collected from the processing chamber. Alternatively, the hardware parameter data can be collected from a control system integrated or coupled with the processing chamber. In another embodiment, the hardware parameter data include other parameters that are related to the processing chamber but are not preset, such as the thickness of a film formed on the chamber wall of the processing chamber.

In another embodiment, the manufacturing data include process parameter data (process data) of a semiconductor process implemented in the processing chamber. The process parameter data include processing parameters defined in the corresponding processing recipes. In various examples, the process parameter data include gas flow rate, bias power, or electrical current. In one embodiment, the process parameter data can be collected from the processing recipes. In another embodiment, the process parameter data is collected from a tool history database of the processing chamber or are collected through a control system coupled or integrated with the processing chamber. In one example, the control system is a manufacturing execution system (MES) coupled with the processing chamber.

In the existing method, the manufacturing data are collected statically, where the manufacturing data are extracted only at a particular point of time, such as the beginning of the semiconductor process or the end of the semiconductor process. Therefore, thus collected manufacturing data are referred to as static manufacturing data. However, the static manufacturing data could not catch the process variation during the semiconductor process and do not include process information over time during the semiconductor process. For example, the static manufacturing data do not include information of the process stability, high frequency variation, shifting/drifting pattern during the semiconductor process, and process time behavior during the semiconductor process. Therefore, the corresponding chamber matching method using the static manufacturing data is only based on a small fraction of the manufacturing data associated with that particular point of time.

In the present embodiment, the manufacturing data are provided dynamically, where the manufacturing data are extracted through a period of time instead of at a particular point of time. Accordingly, those manufacturing data are referred to as dynamic manufacturing data or dynamic input. The dynamic manufacturing data are collected over time to catch the chamber variation and chamber mismatch. In one example, the hardware parameter data is collected at each sub-step during the semiconductor process. In another example, the process parameter data is collected at regular intervals, such as every 0.1 second or every 1 second. In one example, the chamber temperature is extracted every 0.1 second or every 1 second instead of averaging the chamber temperature. Alternatively, the manufacturing data can be collected at irregular intervals to catch critical sub-steps or critical time frames. Thus, instead of collecting static manufacturing data, the disclosed method dynamically collects the manufacturing data and uses the dynamic input for evaluating the chamber mismatch, which will effectively track the chamber mismatch over time and/or over processing stages. The chamber mismatch identified by the disclosed method will be represented as a function of time.

In another embodiment, the manufacturing data further include product parameter data (product data). The product data include various product parameters of semiconductor substrates (or wafers) processed in the processing chamber. The product data is usually collected from one or more metrology tools, thus also referred to as metrology data. The product data include critical dimension, film thickness, or optical reflectivity of a metal layer in various examples. The metrology data from the products usually are static instead of dynamic since the product data is usually collected after the completion of the semiconductor processes.

To a semiconductor process applied to a wafer and implemented in the processing chamber, the tool data and process data is input to determine and frame the semiconductor process. The product data is output and characteristics of the wafer processed by the semiconductor process.

In yet another embodiment, the input of the manufacturing data includes the manufacturing data from a golden chamber. For example, the input from the golden chamber includes tool data, process data and product data. The golden chamber is a chamber similar to the processing chamber and is capable of implementing the semiconductor process, such as etching. In various embodiments, the dynamic input of the golden chamber can be collected before, during and/or after identifying the golden chamber. In another embodiment, the input of the manufacturing data from the golden chamber may not be collected every time when a new processing chamber is evaluated for chamber match.

In yet another embodiment, the input of the manufacturing data includes the manufacturing data from a reference chamber. The input from the reference chamber is substantially similar to the input from the processing chamber (or the golden chamber). The reference chamber is similar to the processing chamber (or the golden chamber) and is capable of carrying on the semiconductor process. In various embodiments, the input of the manufacturing data from the reference chamber are be collected before, during and/or after identifying the reference chamber. In yet another embodiment, the input of the reference chamber may not be collected every time when a new processing chamber is evaluated for chamber match (or mismatch). In the disclosed method, the reference chamber is employed for evaluating the chamber mismatch in addition to the golden chamber. By using both the golden chamber and the reference chamber, the evaluation of the processing chamber for chamber mismatch is more accurate and the chamber match tuning is more effective.

In yet another embodiment, the manufacturing data at block 102 include multiple wafers of a same product, such as a lot or 50 wafers. In yet another embodiment, the manufacturing data at block 102 include a plurality of wafers from different products, such as a lot from a first product and a lot from a second product.

The method 100 for chamber match includes performing a dynamic multivariate analysis (MVA) at block 104 to extract (or generate) a matching index at block 106. The dynamic MVA is applied to the manufacturing data to extract an effective parameter as an indication of the chamber mismatch. Because the multivariate analysis uses the dynamic manufacturing data from the hardware parameters and process parameters, the corresponding MVA is therefore referred to as dynamic multivariate analysis or dynamic variable analysis.

In one embodiment, the MVA at block 104 includes partial least squares (PLS) model, partial least squares-discriminant analysis (PLS-DA), and principal component analysis (PCA). The application of the MVA to the manufacturing data includes applying a particular MVA model at a particular condition. In furtherance of the present embodiment, the MVA implements one of the MVA models according to the availability of the golden chamber, the availability of the reference chamber and the availability of the metrology data.

In one example, if blank test wafers are used for analyzing the chamber match, no CD data is available since the blank test wafers have no patterns formed on.

When the golden chamber is not available (not identified), the method 100 proceeds to identify or qualify the golden chamber before performing multiple variable analysis. In one embodiment, a golden path finder (GPF) is employed to identify the golden chamber. The GPF includes a statistical model/procedure to evaluate various parameters of the golden chamber based on the manufacturing data. For example, various wafers processed in the golden chamber are measured for a critical dimension (CD) to check if the CD meets the specification. In another example, a statistical method is applied to the manufacturing data of the golden chamber to find out if the standard deviation is within a certain range. In another embodiment, the MVA employs statistical quality control (SQC) to identify the golden chamber. In yet another embodiment, the MVA employs other analysis technique such as exploratory data analysis (EDA) to process the manufacturing data for the qualification of the golden chamber. After the golden chamber is identified/qualified, the method 100 proceeds to evaluate the processing chamber for the chamber mismatch according to the identified golden chamber.

In a first condition when the golden chamber is ready and the metrology data is available, the MVA at block 104 employs the PLS model to generate a matching index at block 106 for evaluating chamber matching. The PLS model is a statistical regression method that finds a linear regression model by projecting the predicted variables and the observable variables to a new space. In the present embodiment, the predicted variables include one or more product parameters from the metrology data. The observable variables include various hardware parameters and process parameters.

The product parameters includes characteristic parameters of the processed products. The examples of the product parameters include etched polysilicon gate dimension, etched contact hole diameter, patterned photoresist line width, deposited film thickness and so on, collectively referred to as critical dimension (CD) parameters.

The matching index is an effective parameter generated by the MVA to monitor the chamber mismatch. In the present embodiment, the matching index is a relevant CD parameter. For example, the matching index is the gate dimension in a gate etching process. In another example, the matching index is the film thickness in a deposition process. In yet another example, the matching index is the photoresist line width in a photolithography exposure process.

Since product parameter is determined by the corresponding process and the processing chamber, the product parameter is a function of the hardware parameters and the processing parameters. Accordingly, the matching index in the first condition is a function of the hardware parameters and the processing parameters.

In one embodiment, the matching index is related to the hardware parameters using the PLS model. Specifically, the matching index (or the CD parameter) is more sensitive to some of the hardware parameters than some other of the hardware parameters. In the least square regression, the matching index is related to each hardware setting parameter with a different coefficient. In another embodiment, the matching index is related to the hardware parameters and the process parameters using the PLS model. In yet another embodiment, the matching index is related to the process parameters in the PLS model.

In a second condition when the golden chamber is ready, the metrology data is not available, and the reference chamber is not available, the MVA at block 104 employs the PCA model to generate a matching index at block 106.

The PCA model uses a mathematical procedure that transforms a number of possibly correlated variables into a smaller number of uncorrelated variables, called principal components. Since the metrology data is not available, the CD parameter cannot be used as the matching index. In a space of various hardware and process parameters, the PCA approach can generate a set of parameters each being a combination of various hardware parameters and process parameters. In another example, the PCA approach generates a set of parameters each being a combination of various hardware parameters. Those generated new parameters are referred to principal components. All principal components are ranked with different relevance. The first principal component accounts for as much of the variability in the data as possible, and each succeeding component accounts for as much of the remaining variability as possible. The first principal component is chosen to be the matching index. As one example for illustration, the matching index is a linear combination of the chamber pressure and chamber temperature.

Prior to the PCA at block 104, the manufacturing data is dynamically collected over various wafers, over times, and/or over sub-steps. In one example for illustration, 50 wafers are processed a golden chamber by a semiconductor process. The manufacturing data include 100 hardware and process parameters. The semiconductor process includes 10 sub-steps and last 200 seconds. The 100 hardware and process parameters are collected for 50 wafers at every 1 second (or every sub-step). The collected data is distributed in a 100 dimensional space where each dimension represents one hardware or process parameter. Each dot in the 100 dimensional space represents a set of hardware and process parameters for a wafer at a certain time. The PCA is applied to those data in the 100 dimensional space to find the principal components, especially the matching index.

In yet another embodiment, the manufacturing data is collected from both the golden chamber and the processing chamber, then the PCA model is applied to the manufacturing data of the golden chamber and processing chamber to identify a principal component as an indicator for chamber matching. The values of the matching index for both the golden chamber and the processing chamber are compared for the difference. The processing chamber is determined to be matched if the difference is within a certain range (such as $2\sigma$). Otherwise, it is determined to be mismatched.

In a third condition when the golden chamber is ready, the metrology data is not available, and the reference chamber is available, the MVA at block 104 employs the PLS-DA model to generate a matching index at block 106. For example, a predictive parameter is generated to determine the chamber matching.

The PLS-DA CA model uses a mathematical procedure to provide a binary result of the chamber match: matched or mismatched. In one embodiment, a PCA model is applied to the golden chamber to find the first principal component. The first principal component is used as a predictive parameter for chamber matching analysis. The first principal component is a linear combination of some hardware and process parameters. Then, the reference chamber is evaluated relative to the golden chamber based on the first principal component. The distance D1 between the golden chamber and the reference chamber in the first principal component is determined. Similarly, the distance D2 between the golden chamber and the processing chamber in the first principal component is determined as well. The distance D2 is then compared with the distance D1 for the chamber match. In one embodiment, if the D2 is greater than D1, the processing chamber is determined to be mismatching. If the D2 is less than D1, the processing chamber is determined to be matching. In a more specific embodiment, the first principal component is a linear combination of n some hardware and process parameters, $X_1$, $X_2$, ..., and $X_n$. The values of the those n parameters to the golden chamber are $G_1, G_2, \ldots,$ and $G_n$. Similarly, the values of the those n parameters to the reference chamber are $R_1$, $R_2$, ..., and $R_n$. The values of the those n parameters to the processing chamber are $P_1, P_2, \ldots,$ and $P_n$. In one embodiment, the distance between the golden chamber and reference chamber is determined by $D1=[(G_i-R_i)^2/(n-1)]^{1/2}$. The distance between the golden chamber and processing chamber is determined by $D2=[(G_i-P_i)^2/(n-1)]^{1/2}$. In one embodiment of the discriminant analysis, the processing chamber is
matching if D2<D1, and
mismatching if D2>D1.

In another embodiment, several principal components are used as a set of predictive parameters for chamber matching analysis.

The method 100 includes blocks 102, 104 and 106 to generate an effective matching index for chamber matching evaluation. The method 100 also includes other steps for tuning the processing chamber if the chamber mismatching is identified. Specifically, the method 100 includes identifying those parameters critical to mismatch of the processing chamber. Those identified parameters are referred to as variable of important parameters (VIPs or important variables). In one embodiment, the VIPs include hardware parameters. When hardware parameters are matched, a processing recipe for the same semiconductor process can be universally applicable to multiple processing chambers to achieve the manufacturing simplicity, efficiency and quality control. In another embodiment, the VIPs include both hardware parameters and process parameters. In this case, the hardware parameters are adjusted and the process parameters are tuned using a procedure associated with various situations, which will be further described.

The method 100 includes performing a VIP selection at block 108, resulting in VIPs at block 110. The VIP selection at block 108 takes the matching index as the input. The VIPs are generated as the output. In the third condition where the PLS-DA model is implemented, the input to the VIP selection at block 108 is a predictive parameter (or a set of predictive parameters), such as the first principal component, collectively referred to as the matching index.

The VIP selection at block 108 includes a reverse conversion to identify critical parameters from the matching index (or the predictive parameter). In one embodiment, the hardware parameters are identified from the matching index. For example, if the matching index is the first principal component as a linear combination of a subset of the hardware parameters, the subset of the hardware parameters are identified as VIPs for the chamber tuning. In another example, if the predictive parameter is used for monitoring the chamber matching, the hardware parameters are identified from the predictive parameter as VIPs. In yet another example, if the principal component is a combination of a subset of the hardware and process parameters, then the subset of the hardware and process parameters are VIPs. In yet another example, if the matching index is the CD parameter, then the hardware and process parameters in the least square regression are identified as VIPs for the chamber tuning.

In yet another example, the multiple principal components are employed to uncover the tunable parameters. Then the multiple principal components are analyzed to identify the VIPs according to a selection criteria. In one embodiment, the following selection formula is used to identify the VIPs from the multiple principal components, $$VIP_{AK} = \sqrt{\sum_{a=1}^{A}(w_{ak}^2 * (SSY_{a-1} - SSY_a)) * \frac{K}{(SSY_a - SSY_A)}}$$

Various parameters in the above selection formula are defined in the following table.

| Parameter | Definition |
| --- | --- |
| SSY | Sum of squares of the Y matrix. For component number A, it is the Y residual Sum of Squares after component A. |
| w | Weights that combine the X variables (first dimension) or the X residuals (subsequent dimensions) to form the score t (t is principal component of matrix X). These weights are selected so as to maximize the correlation between t and u (u is principal component of matrix Y), thereby indirectly between t and Y. X variables with large w's (positive or negative) are highly correlated with u (and Y). |
| a | Index for principal component; a = 1, 2, ..., A |
| A | Number of principal components |
| k | Index for X variables; k = 1, 2, ..., K |
| K | Number of X variables |

Each variable $X_k$ is a hardware parameter or a process parameter. Each Y is a CD parameter or a principal component. The selection formula is applied to each variable $X_k$ to determine if it is a VIP. When the $VIP_{Ak}$ for the $X_k$ is greater than 1, then $X_k$ is chosen as a VIP. Otherwise, $X_k$ is not a VIP. When the VIPs are identified. The chamber match can be achieved by tuning the VIPs.

In another embodiment, the method 100 includes performing design of experiment (DOE) procedure at block 112 to filter the VIPs, forming a small group of tunable parameters 114 for chamber tuning. In another example, the DOE help to identify various tunable process parameters if a critical hardware parameter is not tunable or cannot be fully tuned for chamber matching. In various embodiments, the DOE at block 112 uses a Taguchi method, response surface methodology, D-optimization, or a combination thereof. In another embodiment, the DOE includes Box Behnken, factorial design, or a combination thereof. The VIPs may include both hardware parameters and process parameters. One example is provided here for illustrating how the DOE procedure is implemented to generate the tunable parameters. If the processing chamber is not matched when excluding the process parameters, then a DOE procedure, such as the responsive surface model, is applied to the hardware parameters of the VIPs to determine the tunable hardware parameters. The tunable hardware parameters of the processing chamber are adjusted to match those of the golden chamber. In another embodiment, the DOE procedure have various experimental objectives including screening, optimization and robustness test in various embodiments. In various examples, the screening includes full factorial and fractal factorial designs, and further includes linear models, interaction models, identification of influential factors, and determining appropriate ranges of the influential factors. The optimization includes center composite design, and further includes quadratic term modeling and optimum identification. The robustness testing includes strategies to adjust factors to guarantee robustness, and decision of product specification change to achieve the robustness.

In another embodiment of the DOE procedure, when a hardware parameter may not be directly tunable, the DOE procedure is implemented to find tunable parameters, such as processing parameters. Those tunable parameters are tuned to compensate the mismatch such that the CD parameters are matched. For example, an electrical capacitor from wall film of the processing chamber is a hardware parameter relevant to the CD parameters. However, the electrical capacitor of the processing chamber cannot be easily adjusted. The corresponding capacitance of the processing chamber may be a function of or be related to various processing parameters in term of the CD parameters. In other words, the CD mismatch caused by the electrical capacitor can be compensated and canceled by tuning the relevant processing parameters. For example, the pressure and flow rate of the processing chamber may be tuned to reduce or eliminate the CD deviation caused by this capacitor. The DOE procedure can be used to identify those relevant processing parameters.

The method 100 includes both monitoring if a processing chamber is matched and tuning if the processing chamber is not matched. The monitoring procedure uses dynamic manufacturing data as input and generates a matching index using a dynamic multivariate analysis model according to an individual condition. The tuning procedure takes the matching index as the input, performs a reverse conversion to recover the hardware parameters and process parameters associated with the matching index, and generates VIPs for tuning the processing chamber. In one embodiment, the DOE step is applied to further select the process parameters for chamber tuning. In one practical example, there are hundreds of hardware and process parameters. Engineers are needed to do a preliminary selection based on engineers' experience and instinct. The disclosed method is a systematic approach without engineer interference in one embodiment.

Figure 2:
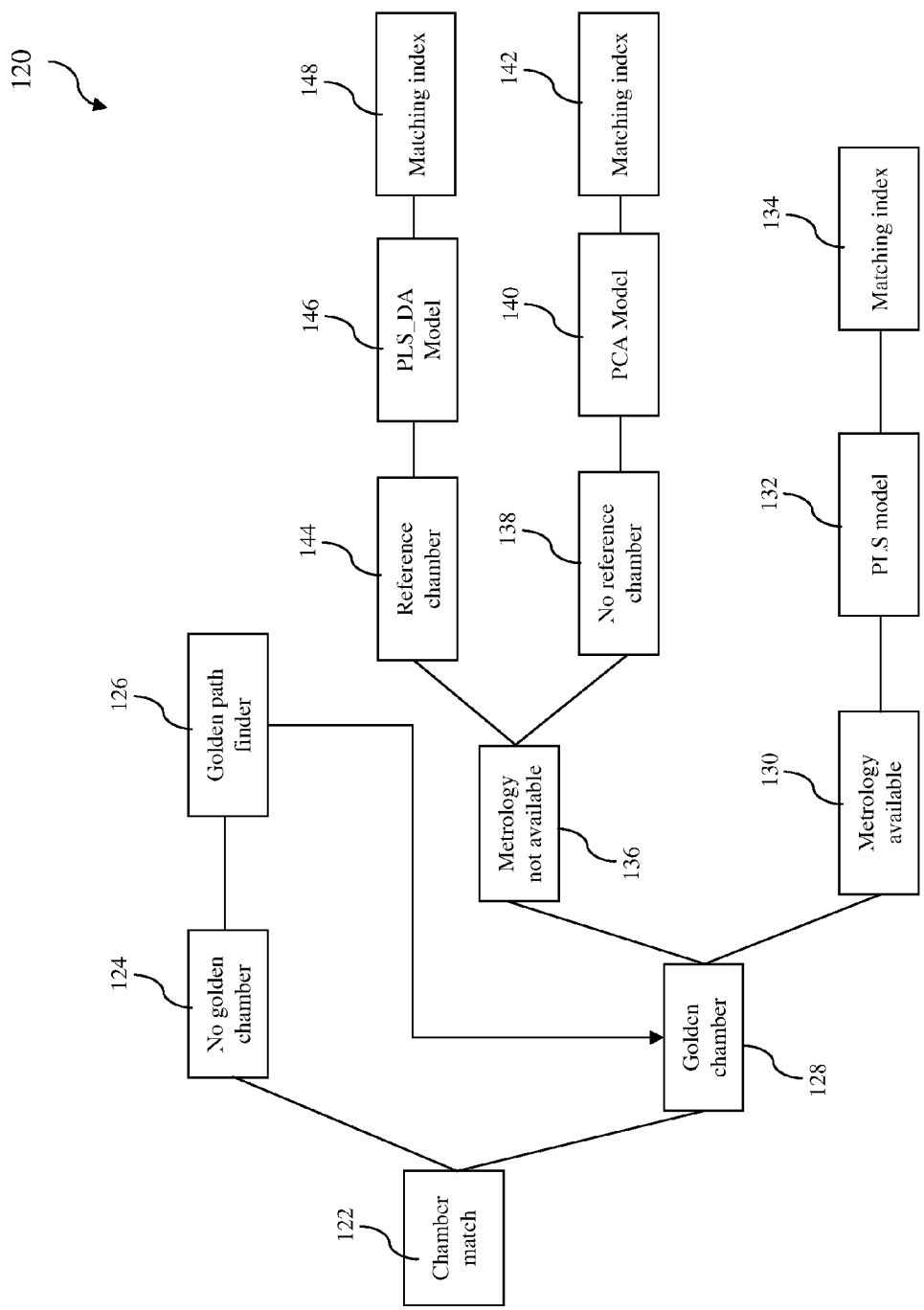

FIG. 2 is a simplified flowchart of a method 120 for identifying a match index and monitoring chamber match constructed according to various aspects of the present disclosure in another embodiment. The detailed description is simplified if similar features are described in the method 100 of FIG. 1. The method 120 begins at block 122 by targeting or choosing a processing chamber for chamber match evaluation. The processing chamber is a chamber to be evaluated for chamber mismatching and can be a wet etching chamber, a plasma etching chamber, a CVD chamber, a PVD chamber, a thermal annealing chamber, a chemical mechanic polishing (CMP) chamber, a thermal oxidation chamber, or any other processing chamber.

The method 120 proceeds to block 124 if a golden chamber is not ready. A golden path finder at block 126 will be implemented to qualify a golden chamber, including collecting manufacturing data from the golden chamber, analyzing the manufacturing data, and evaluating the manufacturing data to determine if the golden chamber meets the qualification criteria. The qualified golden chamber and the associated data is provided at block 128 for further processing.

When the golden chamber is qualified and ready at block 128, the method 120 proceeds to different procedure depending on the availability of the metrology data and the availability of the reference chamber.

The method 120 proceeds to block 130 if the metrology data is available. In this case, the processed substrates are not blank wafers but include circuit patterns so that the metrology data can be collected from those wafers. The method 120 performs multivariate analysis using a PLS model at block 132. The PLS model at block 132 takes the input from the metrology data, the hardware parameter data and the process parameter data. The PLS model generates a matching index at block 134 as an indicator for evaluating chamber match. The matching index at block 134 includes a product parameter (or referred to as CD parameter), such as trench width, deposition thickness, doping concentration, or thermal oxide thickness. The evaluation of the chamber matching may include defining a criteria, such as a CD tolerance range. If the CD difference between the processing chamber and the golden chamber is less than the CD tolerance range, the processing chamber is determined to be matched. If the CD difference between the processing chamber and the golden chamber is greater than the CD tolerance range, the processing chamber is determined to be mismatched.

The method 120 proceeds to block 136 if the metrology data is not available. In this case, the processed substrates are blank wafers without circuit patterns. When the metrology data is not available, there are two paths depending on the availability of the reference chamber. The reference chamber is similar to the golden chamber and can be qualified for chamber matching evaluation in addition to the golden chamber.

The method 120 proceeds to block 138 if there is no reference chamber. In this condition, the method 120 performs multivariate analysis using a PCA model at block 140. The input of the PCA model at block 140 includes hardware parameter data and the process parameter data. The output of the PCA model includes a matching index at block 142 as an indicator for evaluating chamber match. The matching index at block 142 includes a principal component. Similarly, the difference of the matching index between the golden chamber and processing chamber is evaluated relative to a criteria (e.g., 2σ) to determine the chamber matching.

The method 120 proceeds to block 144 if the metrology data is not available and there is a reference chamber. In this condition, the method 120 performs multivariate analysis using a PLS-DA model at block 146. The input of the PLS-DA model at block 146 includes hardware parameter data and the process parameter data. The output of the PLS-DA model includes a matching index at block 148 as an indicator for evaluating chamber match. The matching index at block 148 includes one or more predictive parameters. The chamber matching is determined by comparing the relative variations among the golden chamber, the reference chamber and the processing chamber. In one example, one predictive parameter is determined for each of the golden chamber, the reference chamber and the processing chamber. A first distance between the golden chamber and the reference chamber in term of the predictive parameter is determined, and a second distance between the golden chamber and the processing chamber in term of the predictive parameter is determined as well. The first and second distances are compared. If the second distance is less than or equal to the first distance, the processing chamber is determined to be matched. Otherwise, the processing chamber is determined to be mismatched.

In another embodiment, the matching index generated by the PLS model at block 134 is related to process parameters. The matching index generated by the PCA model at block 142 is related to hardware parameters. The matching index generated by the PLS-DA model at block 148 is related to hardware parameters.

Figure 3:
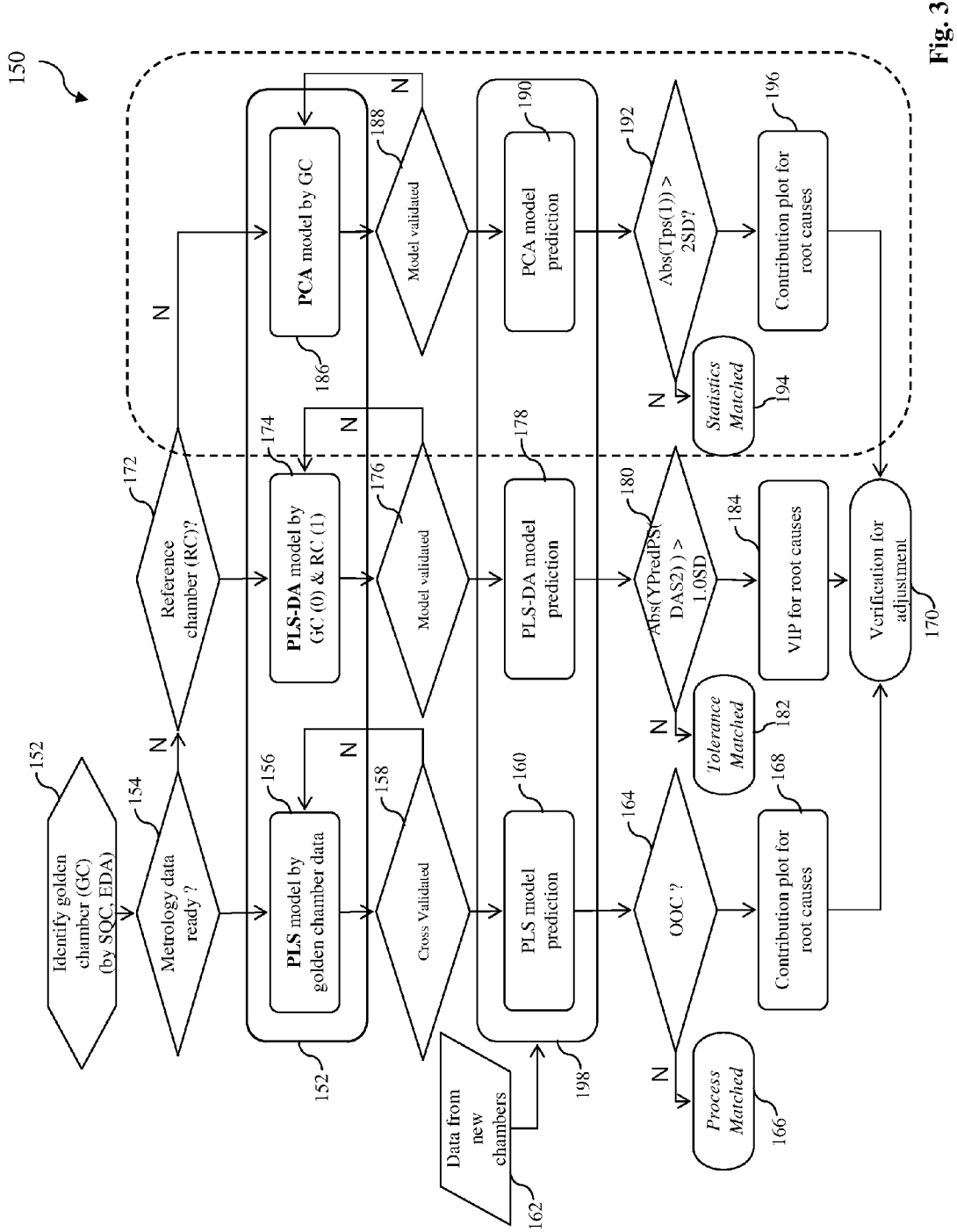

FIG. 3 is a flowchart of a method 150 of monitoring and tuning a processing chamber constructed according to various aspects of the present disclosure in another embodiment. The method 150 begins at block 152 by identifying a golden chamber using a proper technology, such as SQC or EDA. All analysis are applied to the manufacturing data collected from the corresponding chamber, such as the golden chamber. In one embodiment, the manufacturing data is exclusively extracted from a semiconductor process implemented in the corresponding chamber.

After the golden chamber is identified, the method 150 then proceeds to block 154 to check if the metrology data is ready. When the metrology data is ready, the method 150 proceeds to block 156 by performing a multivariate analysis to the golden chamber using a PLS model. Then the method 150 proceeds to block 158 to perform cross validation process. Cross-validation is an approach to assess the results of a statistical analysis. It is employed to estimate the accuracy of a predictive mode. At the cross validation process, the processing chamber is evaluated using one or more statistical parameters. In one embodiment, the processing variation of the processing chamber is determined if it is within a certain range for processing stability and processing control capability. For example, the variation of a CD parameter is determined if it is less than 2σ of the CD parameter of the golden chamber. In another example, the delta Q2 (normalized first component difference) is determined if it is less than a criteria, such as 0.2.

When the processing chamber is cross validated, the method 150 proceeds to block 160 to predict the chamber matching based on the result of the PLS model. The multivariate analysis with the PLS model is applied to the manufacturing data from the processing chamber at block 162. The manufacturing data of the processing chamber include metrology data (product parameter data), hardware parameter data and process parameter data. Then, the prediction of the chamber matching is determined according to the multivariate analysis to the processing chamber. For example, the CD parameter of the processing chamber is compared with the CD parameter of the golden chamber to determine if the CD difference is within a certain range as an indication that the processing chamber is matched. Otherwise, the processing chamber is mismatched.

The method 150 then proceeds to block 164 to determine if the semiconductor process is out of control (OOC) according to the prediction of the PLS model at block 160. If the semiconductor process is under control, then the semiconductor process of the processing chamber is determined to be matched at block 166. Since the processing chamber is compared with the golden chamber in term of the CD parameter instead of the hardware parameters, the matching evaluation between the golden chamber and the processing chamber is only determined at the processing level not necessarily in the hardware level. If the semiconductor process is out of control, the semiconductor process of the processing chamber is determined to be mismatched. Then the method 150 proceeds to block 168 to perform an analysis for the root cause of the chamber mismatch. In one embodiment, the VIPs are identified. In another embodiment, a DOE procedure is implemented to determine the processing parameters to be tuned.

The method 150 proceeds to block 170 to perform chamber tuning and verification. The processing chamber is adjusted according to the root cause analysis. The adjusted processing chamber is further verified or qualified.

Back to Block 154, if the metrology data is not ready, the method 150 proceeds to block 172 to determine if the reference chamber is available. If the reference chamber is available, the method 150 proceeds to perform a multivariate analysis using a PLS-DA model at block 174. Then the method 150 proceeds to perform a model validation test at block 176. When the multivariate analysis fails the model validation test, the method 150 returns to block 174 by performing another multivariate analysis using the PLS-DA model.

The method 150 then proceeds to make a prediction of the processing chamber based on the PLS-DA analysis at block 178. The prediction includes a discriminant analysis to determine if the processing chamber is matched or mismatched. The method 150 also includes a block 180 to determine if Abs(YPredPS(DA$2))>1.0 SD in one embodiment, in which Abs(YPredPS(DA$2)) is the absolute value of predicted principal component of matrix Y and SD is the standard deviation. The formula Abs(YPredPS(DA$2))>1.0 SD means that the absolute value of predicted principal component of matrix Y is greater than the standard deviation. If the above condition is not satisfied, then the processing chamber is tolerance matched at block 182. If the above condition is satisfied, then the method 150 proceeds to block 184 to perform an analysis for the root cause of the chamber mismatch. In one embodiment, the VIPs are identified. The method 150 proceeds to block 170 to perform chamber tuning and verification. The processing chamber is adjusted according to the root cause analysis. The adjusted processing chamber is further verified or qualified.

Back to Block 172, if the reference chamber is not available, the method 150 proceeds to perform a multivariate analysis using a PCA model at block 186. Then the method 150 proceeds to perform a model validation test at block 188. When the multivariate analysis fails the model validation test, the method 150 returns to block 186 by performing another multivariate analysis using the PCA model.

The method 150 then proceeds to make a prediction of the processing chamber based on the PCA analysis at block 190. The prediction includes determining a value of the matching index of the processing chamber. The method 150 also includes a block 192 to determine if Abs(Tps(1))>2 SD in one example, where Abs(Tps(1)) is the absolute value of predicted principal component of matrix X and SD is the standard deviation. The formula Abs(Tps(1))>2 SD means that the absolute value of predicted principal component of matrix X is greater than 2 times the standard deviation. If the above condition is satisfied, then it is concluded that the processing chamber is statistically matched at block 194. If the above condition is not satisfied, then the method 150 proceeds to block 196 to perform a contribution plot for the root cause of the chamber mismatch. In one embodiment, the VIPs are identified. The method 150 proceeds to block 170 to perform chamber tuning and verification. The processing chamber is adjusted according to the root cause analysis and the identified VIPs. The adjusted processing chamber is further verified or qualified.

In various embodiments of the method 150, the prediction using various models, such as the PLS model at block 160, the PLS-DA model at block 178 and the PCA model at block 190, includes take the manufacturing data from the processing chamber at block 162.

Figure 4:
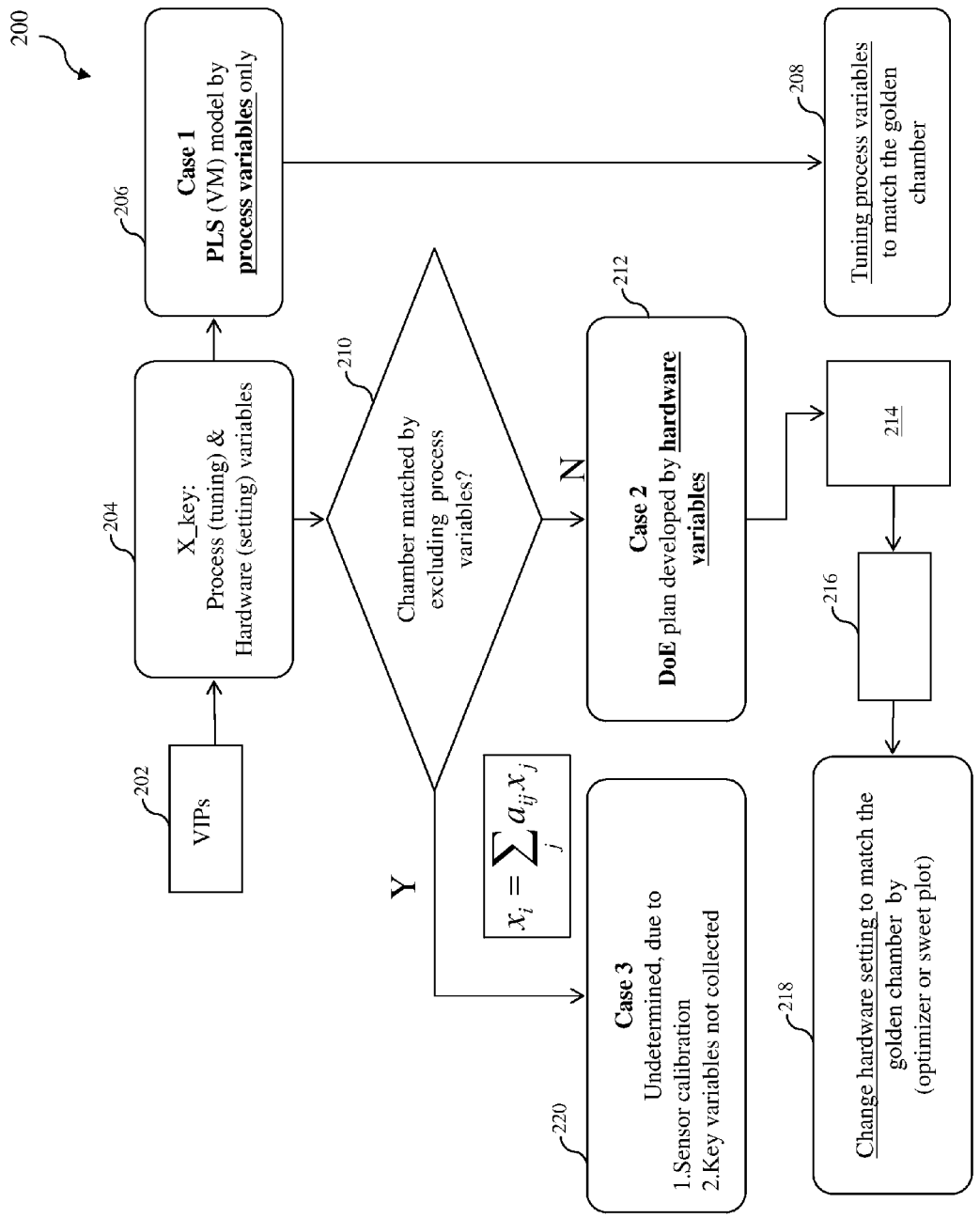

FIG. 4 is another block diagram illustrating a method 200 for tuning a processing chamber if not matched according to one embodiment. The method 200 begins at block 202 by receiving VIPs. In one embodiment, the VIPs are extracted from the matching index or predictive parameter. The method 200 includes a block 204 to find tunable parameters for tuning the process parameters and hardware parameters. In a first condition (case 1) at block 206, the PLS model is applied to the manufacturing data to find tunable process parameters only. Then the process parameters are tuned to match the golden chamber at block 208. In one embodiment, the case 1 is applicable to the situation wherein the metrology data available.

At block 210, the processing chamber is determined if it is matched to the golden chamber when the processing parameter data is excluded. If the processing chamber is not matched with the processing parameters being excluded, the method 200 proceeds to block 212 to perform a DOE procedure, referred to as case 2. The DOE procedure is implemented to the hardware parameters to identify tunable hardware parameters. In case 2, the method 200 may further include multivariate analysis at block 214 and other mathematical model such as response surface at block 216 to further extract a subset of the hardware parameters for resetting. The identified subset of the hardware parameters of the processing chamber are changed to match the golden chamber at block 218. The changes to the hardware parameters (or hardware settings) of the processing chamber include optimizing or finding sweet spot of the processing chamber.

Back to block 210, if the processing chamber is matched or is not determined with the processing parameters being excluded, the method 200 proceeds to block 220 where the chamber match is not determined due to the lack of sensor calibration and the lack of critical parameters (key parameters).

Figure 5:
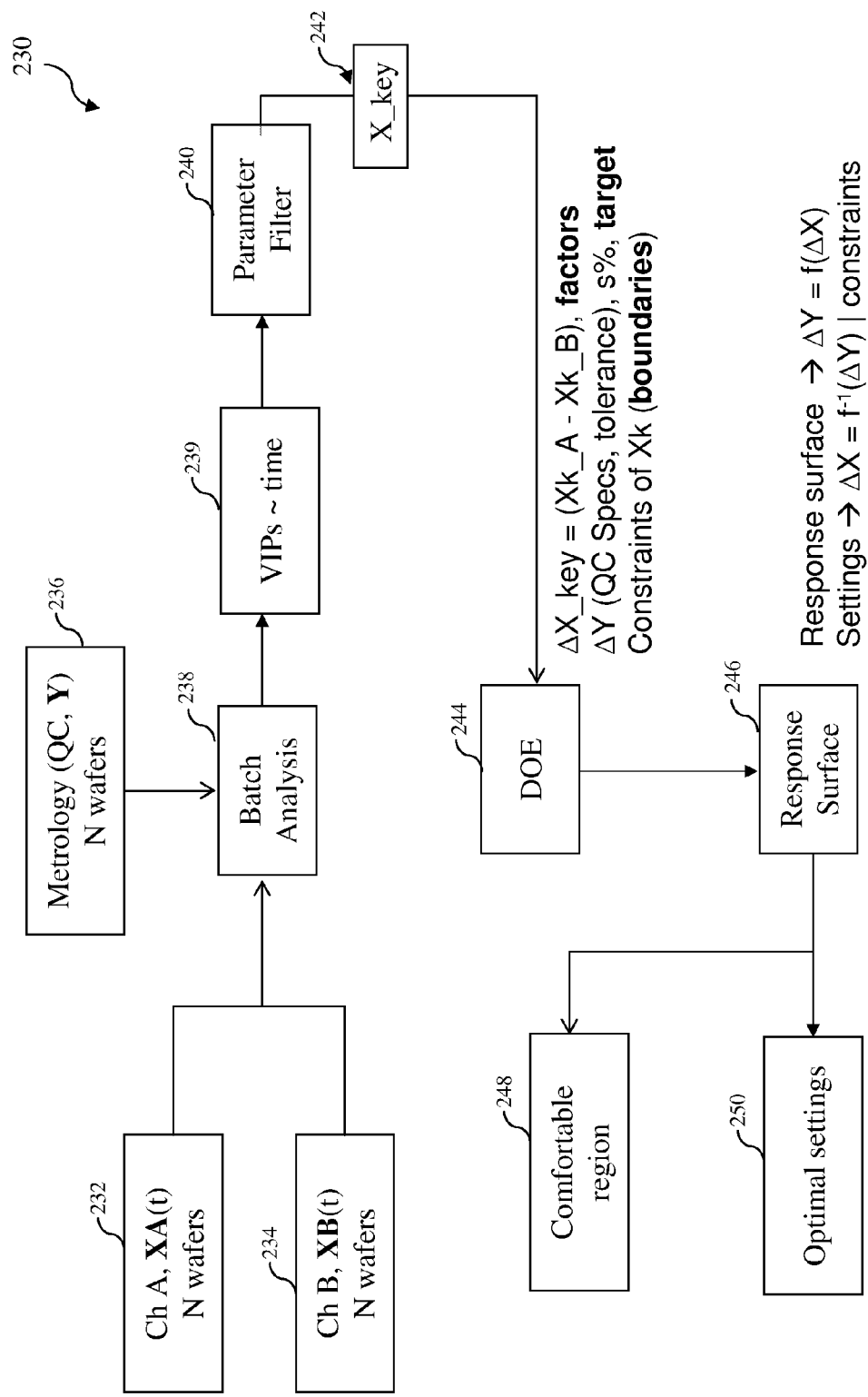

FIG. 5 is another block diagram of a method 230 for chamber matching constructed according to aspects of the present disclosure in one embodiment. The method 230 involves two chambers, chamber A (Ch A) and chamber B (Ch B). A semiconductor process is applied to a first number of wafers in the chamber A at block 232. Similarly, the semiconductor process is applied to a second number of wafers in the chamber B at block 234. In one example, the first and second numbers each are N wafers. The manufacturing data is collected from the first number of wafers and the second number of wafers using one or more metrology tools at block 236. The manufacturing data include CD parameter data and process parameter data in one embodiment. In another embodiment, the manufacturing data include hardware parameter data.

The manufacturing data is batch analyzed at block 238. The batch analysis includes employing dynamic manufacturing data, such as the manufacturing data at various sub-steps of the semiconductor process or the manufacturing data at various times of the semiconductor process (every 1 second or every 0.1 second). In one embodiment, the batch analysis to the manufacturing data includes applying a multivariate analysis to identify VIPs. In another embodiment, the batch analysis to the manufacturing data includes forming a plot for VIPs over time at block 239. The trends and discrepancy of the VIPs for the chambers A and B are analyzed to filter out irrelevant parameters. For example, if the data of one VIP from both chambers are statistically similar, then it is determined to be irrelevant to the chamber mismatch. In another example, if the deviation of the VIP between the two chambers is uncorrelated to the CD variation, then the VIP is filtered out as being irrelevant. The parameter filtering at block 240 include evaluating each VIP according to a new parameter $\Delta Xk=Xk\_A-Xk\_B$, where the term $Xk\_A$ is the value of a key parameter $Xk$ of the chamber A and the term $Xk\_B$ is the value of the key parameter $Xk$ of the chamber B. In various embodiments, the parameter filtering at block 240 include evaluating quality control specification, tolerance, target constrain (such as upper limit and lower limit) and standard deviation of $\Delta Y$ where Y is a CD parameter and $\Delta Y$ is the difference of the CD parameter between the chambers A and B. After the parameter filtering at block 240, one or more critical parameters (or key parameters) are identified at bloc 242.

A DOE procedure is further applied to the key parameters at block 244. In one embodiment, a response surface methodology (RSM) DOE is applied to the key parameters to extract the CD parameter from the identified critical process parameters using a response surface 246. In one embodiment, the response surface is formed as $\Delta Y$ over $\Delta X$. In another embodiment, the response surface of $\Delta Y$ over $\Delta X$ includes more than one critical parameters X. In one example, the response surface provides $\Delta Y=f(\Delta X)$. According to various factors of $\Delta Y$ including QC specification and tolerance, a subset of $\Delta X$ or the values of $\Delta X$ are determined from the response surface as $\Delta X=f^{1}(\Delta Y)$. Thus determined $\Delta X$ are used to change the corresponding critical parameters X of the processing chamber to reach a comfortable region 248 or optimal settings 250. In one example, the $\Delta X$ includes one or more hardware settings to be changed. In another example, the $\Delta X$ includes one or more process parameters to be tuned.

In various embodiments, not only the process parameters are tuned to match the processing chamber. The hardware settings are used to adjust the processing chamber for chamber matching such that a universal processing recipe can be used to various chambers. Particularly, when possible, the hardware parameters are adjusted to match the processing chamber. In one example, only when the hardware parameters are not identified, are not adjustable, or cannot be fully adjusted, then relevant process parameters, such as those in a processing recipe, are tuned or fine tuned such that the CD parameters are matched. In another embodiment, the matching index determined by the dynamic MVA is a function of time. The chamber matching can be evaluated over time for its dynamic behavior and trend. The chamber adjustment and tuning can be implemented as a function of time such that the chamber mismatch can be effectively eliminated.

Figure 6:
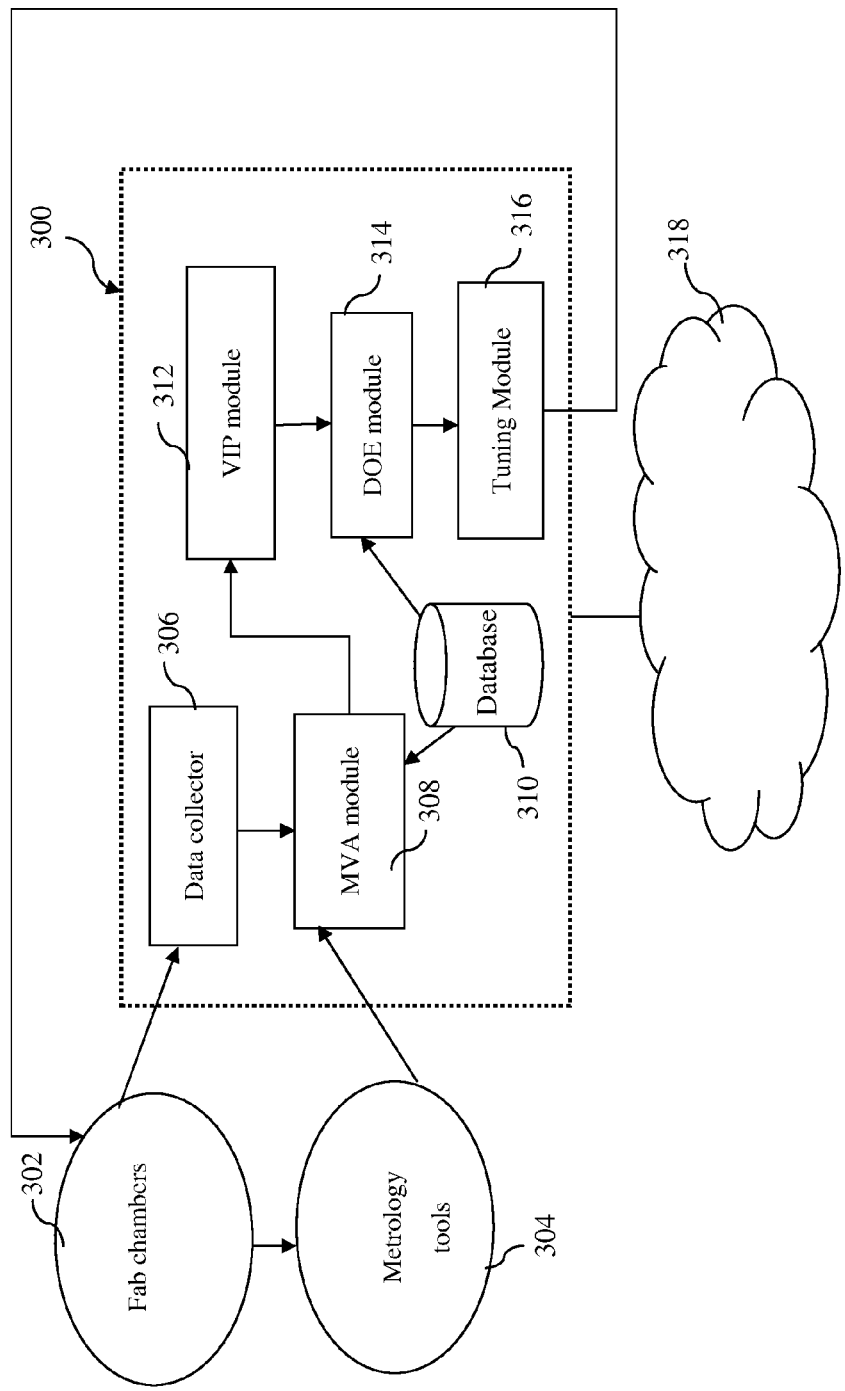
FIG. 6 is a block diagram of one embodiment of a chamber match system to implement a method for chamber matching.

Illustrated in FIG. 6 is a block diagram of one embodiment of a chamber matching and tuning system 300 to implement various chamber monitoring and tuning method. The system 300 is described below, with reference to FIG. 5. The system 300 is designed and configured for chamber monitoring and tuning. The system 300 is coupled with various semiconductor fabrication chambers 302, such as a processing chamber, a golden chamber, and/or a reference chamber operable for a semiconductor process. The system 300 is also coupled with one or more metrology tools 304 designed for measuring various product parameters.

The system 300 includes a data collector 306 to collect various manufacturing data. Data collector 306 is designed to be able to dynamically collect the manufacturing data. In one embodiment, the data collector 306 collects hardware parameter data and process parameter data from the fabrication chambers 302. In another embodiment, the data collector 306 collects product parameter data from the metrology tools 304.

The system 300 includes a multivariate analysis (MVA) module 308 to perform multivariate analysis to the manufacturing data to effectively monitor the processing chamber for chamber matching. The MVA module is coupled to the data collector 306 and takes the dynamic manufacturing data from the data collector 306. Therefore, the MVA module 308 is also referred to as dynamic MVA module.

The MVA module 308 is further coupled with a database 410 that keeps various MVA models including criteria, formula and/or procedure. In one embodiment, the database includes a PLS model, a PLS-DA model and a PCA model. The MVA module 308 is designed operable to apply one of the MVA models to the manufacturing data to extract chamber matching information, such as a matching index. As one example, the PLS model is triggered if the metrology data is available. In another example, the PLS-DA model is triggered if the metrology data is not available and the reference chamber is ready. In another example, the PCA model is triggered if the metrology data is not available and a reference chamber is not ready.

In one embodiment, the MVA module further includes a first sub-module for extracting the matching index using a PLS model and configured to be trigged when the metrology data is available; a second sub-module for extracting the matching index using a PCA model and configured to be trigged when the metrology data is not available and a reference chamber is not ready; and a third sub-module for extracting the matching index using a PLS-DA model and configured to be trigged when the metrology data is not available and the reference chamber is ready. In another embodiment, the MVA further includes a batch analysis sub-module.

The system 300 includes a VIP module 312 coupled with the MVA module 308. The VIP module 312 is designed to extract various VIPs for chamber tuning/adjusting. The VIPs are extracted from the chamber matching information. In one embodiment, the VIPs are extracted from the matching index by a reverse conversion. In another embodiment, the VIP module includes a selection formula to select VIPs.

The system 300 includes a DOE module 314 coupled with the VIP module 312. The DOE module 314 is designed to apply to the VIPs to identify tunable parameters (such as process parameters) or determine the tuning values of the VIPs for chamber tuning/adjusting. The DOE module 314 is further coupled with the database 310 for various DOE model/procedure. In one embodiment, the database 310 includes a Taguchi method, response surface methodology, D-optimization, and combinations thereof. In another embodiment, the database 310 is distributed in different modules such as the MVA module 308 and the DOE module 314.

The system 300 includes a tuning module 316 coupled with the DOE module 314. The tuning module 316 is coupled to the fabrication chambers and is designed to tune/adjust the processing chamber according to determined tunable parameters or determined tuning values of the VIPs.

The system 300 is coupled to a communications network 318. The network 318 may be a single network or may be a variety of different networks, such as an intranet and the Internet, and may include both wireline and wireless communication channels. In one embodiment, the fabrication chambers 302 and the metrology tools 304 are coupled to the network 318 thus the various couplings or a subset of couplings between different entities are through the network 318.

As one example, a fabrication chamber is a thermal furnace designed for forming a thermal silicon oxide film, also referred to as a thermal oxide furnace. In this example, the processing chamber, the golden chamber and/or a reference chamber are various thermal oxide furnaces. In another example, a fabrication chamber is a CVD chamber designed for performing a CVD deposition process, resulting in a CVD film.

The metrology tools 304 may include electrical, optical, and/or analytical tools, such as microscopes, micro-analytical tools, line width measurement tools, resistivity and contact resistance measurement tools, mobility and carrier concentration measurement tools, junction depth measurement tools, film thickness measurement tools, and other test and measurement tools. The product data may include wafer results such as wafer parameters measured by the metrology tools. The wafer parameters may include CD parameters and may additionally include sheet resistance, reflectivity, and other product parameters.

The system 300 may be further coupled to a data control center such as a manufacturing execution system (MES) system wherein the chamber monitoring and tuning/adjusting are controlled, organized, and distributed.

In summary, the methods and system disclosed herein provide a way to monitor and tune/adjust a processing chamber for chamber matching. In doing so, the present disclosure offers several advantages over prior art methods. In various embodiments, advantages of the present disclosure include dynamic manufacturing data over time, hardware setting adjustment, identifying VIPs from the matching index, applying DOE to the VIPs instead of a large number of parameters.

Thus, the present disclosure provides a method of chamber. The method includes identifying a golden chamber designed operable to implement a semiconductor process; identifying a reference chamber designed operable for the semiconductor process; and extracting a matching index of a processing chamber relative to the golden chamber and the reference chamber using a dynamic variable analysis.

In one embodiment, the extracting a matching index of a processing chamber includes using a partial least square and discriminant analysis. In anther embodiment, the method further includes selecting variables of importance (VIPs) from the matching index. In yet another embodiment, the method further includes identifying a hardware parameter for chamber setting based on the VIPs using design of experiments (DOE). In yet another embodiment, the DOE includes one selected from the group consisting of a Taguchi method, response surface methodology, D-optimization, and combinations thereof. In yet another embodiment, the method further includes adjusting the hardware parameter according to the DOE. In yet another embodiment, the method further includes fine tuning a process parameter according to the DOE. In yet another embodiment, the extracting the matching index includes extracting the matching index as a function of time. The extracting the matching index may include collecting manufacturing data from the processing chamber at various processing times.

The present disclosure also provide a method for chamber matching in another embodiment. The method includes identifying a golden chamber designed for a semiconductor process; and extracting a matching index of a processing chamber using a dynamic variable analysis. The extracting the matching index further includes extracting the matching index using a partial least square (PLS) model if metrology data is available; extracting the matching index using a principal component analysis (PCA) model if the metrology data is not available and a reference chamber is not ready; and extracting the matching index using a partial least square-discriminant analysis (PLS-DA) model if the metrology data is not available and the reference chamber is ready.

In one embodiment, the method further includes selecting very important parameters (VIPs) from the matching index; and identifying a tunable parameter based on the VIPs using design of experiments (DOE). In another embodiment, the DOE includes a procedure selected from the group consisting of a Taguchi method, response surface methodology, D-optimization, and combinations thereof. In yet another embodiment, the selecting the VIPs includes selecting a VIP if a filtering parameter VIP is greater than 1. The filtering parameter is defined as, $$VIP_{AK} = \sqrt{\sum_{a=1}^{A}(w_{ak}^2*(SSY_{a-1}-SSY_a))*\frac{K}{(SSY_a-SSY_A)}}$$

In which SSY is a sum of squares of a Y matrix; w is weight of a X variable; a is an index of a principal component; A is a number of principal components; k is an index of the x variable; and K is a number of X variables. In yet another embodiment, the method further includes adjusting a hardware parameter of the processing chamber if a mismatch of the processing chamber is identified by the matching index. The method may further include fine tuning a processing parameter associated with the processing target chamber. In yet another embodiment, the extracting the matching index includes dynamically collecting manufacturing data from at least one of hardware parameters of the processing chamber and process parameters associated with the processing chamber.

The present disclosure also provides a system for chamber match. The system includes a multivariate analysis (MVA) module designed to identify a matching index by performing a MVA model to dynamic manufacturing data from a processing chamber and being associated with a semiconductor process; a variable of importance (VIP) module designed to identify VIP parameters from the matching index; and a design of experiment (DOE) module designed to identify a tunable parameter from the VIP parameters using a DOE model.

In one embodiment, the MVA module further includes a first sub-module for extracting the matching index using a partial least square (PLS) model and configured to be trigged when the metrology data is available; a second sub-module for extracting the matching index using a principal component analysis (PCA) model and configured to be trigged when the metrology data is not available and a reference chamber is not ready; and a third sub-module for extracting the matching index using a partial least square-discriminant analysis (PLS-DA) model and configured to be trigged when the metrology data is not available and the reference chamber is ready. In another embodiment, the system further includes a data collector coupled with a metrology tool to collect product parameter data and coupled with the processing chamber to collect hardware parameter data and process parameter data. In yet another embodiment, the system further includes a database having data associated with at least a subset of a PLS model, a PCA model, a PLS-DA model, a batch analysis model, a Taguchi method, response surface methodology, and D-optimization method.

The foregoing has outlined features of several embodiments. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method of modifying a chamber in a semiconductor manufacturing facility, the method comprising:
    identifying a first, golden chamber operable to implement a semiconductor process;
    identifying a second, reference chamber operable for the semiconductor process;
    extracting a matching index of a third, processing chamber relative to the golden chamber and the reference chamber using a dynamic variable analysis; and
    modifying the third, processing chamber according to the matching index,
    wherein the extracting of the matching index includes determining a first distance in a predictive parameter between the golden chamber and the reference chamber, and comparing the first distance to a determined second distance in the predictive parameter between the golden chamber and the processing chamber.

2. The method of claim 1, wherein the extracting a matching index of a processing chamber further includes using a partial least square and discriminant analysis to determine the first distance in the predictive parameter and the second distance in the predictive parameter.

3. The method of claim 1, further comprising selecting variables of importance (VIPs) from the matching index.

4. The method of claim 3, further comprising identifying a hardware parameter for chamber setting based on the VIPs using design of experiments (DOE).

5. The method of claim 4, wherein the DOE includes one selected from the group consisting of a Taguchi method, response surface methodology, D-optimization, and combinations thereof.

6. The method of claim 4, further comprising adjusting the hardware parameter according to the DOE.

7. The method of claim 6, further comprising fine tuning a process parameter according to the DOE.

8. The method of claim 1, wherein the extracting the matching index of a processing chamber further includes extracting the matching index as a function of time.

9. The method of claim 8, wherein the extracting the matching index of a processing chamber further includes collecting manufacturing data from the processing chamber at various processing times.

10. The method of claim 1, wherein the predictive parameter is selected based on a filtering parameter $VIP_{ak}$ of the predictive parameter being greater than 1, in which the filtering parameter is defined as, $$VIP_{AK} = \sqrt{\sum_{a=1}^{A}(w_{ak}^2*(SSY_{a-1}-SSY_a))*\frac{K}{(SSY_a-SSY_A)}}$$

where SSY is a sum of squares of a Y matrix; w is weight of a X variable; a is an index of a principal component; A is a number of principal components; k is an index of the x variable; and K is a number of X variables.

11. A method, comprising:
    identifying a golden chamber designed for a semiconductor process; and
    extracting a matching index of a processing chamber using a dynamic variable analysis, wherein the extracting the matching index further includes:
        extracting the matching index using a partial least square (PLS) model if metrology data is available;
        extracting the matching index using a principal component analysis (PCA) model if the metrology data is not available and a reference chamber is not ready; and
        extracting the matching index using a partial least square-discriminant analysis (PLS-DA) model if the metrology data is not available and the reference chamber is ready; and selecting very important parameters (VIPs) from the matching index;
identifying a tunable parameter based on the VIPs using design of experiments (DOE); and
modifying the processing chamber based on the matching index,
wherein the selecting the VIPs comprises selecting a VIP if a filtering parameter $VIP_{ak}$ is greater than 1, in which the filtering parameter is defined as, $$VIP_{AK} = \sqrt{\sum_{a=1}^{A} (w_{ak}^2 * (SSY_{a-1} - SSY_a)) * \frac{K}{(SSY_a - SSY_A)}}$$

where SSY is a sum of squares of a Y matrix; w is weight of a X variable; a is an index of a principal component; A is a number of principal components; k is an index of the x variable; and K is a number of X variables.

12. The method of claim 11, wherein the DOE includes a procedure selected from the group consisting of a Taguchi method, response surface methodology, D-optimization, and combinations thereof.

13. The method of claim 11, further comprising adjusting a hardware parameter of the processing chamber if a mismatch of the processing chamber is identified by the matching index.

14. The method of claim 13, further comprising fine tuning a processing parameter associated with the processing target chamber.

15. The method of claim 11, wherein the extracting the matching index includes dynamically collecting manufacturing data from at least one of hardware parameters of the processing chamber and process parameters associated with the processing chamber.

16. A system for chamber match, comprising:
a multivariate analysis (MVA) module operable to identify a matching index by performing a MVA model to dynamic manufacturing data from a processing chamber and being associated with a semiconductor process;
a variable of importance (VIP) module operable to identify VIP parameters from the matching index; and
a design of experiment (DOE) module operable to identify a tunable parameter from the VIP parameters using a DOE model,
wherein the MVA module includes a first sub-module operable to extract the matching index by comparing a first distance in a predictive parameter between a golden chamber and a reference chamber with a second distance in the predictive parameter between the golden chamber and the processing chamber.

17. The system of claim 16, wherein the MVA module further includes
a second sub-module for extracting the matching index using a partial least square (PLS) model and configured to be trigged when the metrology data is available; and
a third sub-module for extracting the matching index using a principal component analysis (PCA) model and configured to be trigged when the metrology data is not available and the reference chamber is not ready;
wherein the first sub-module extracts the matching index using a partial least square-discriminant analysis (PLS-DA) model and is configured to be trigged when the metrology data is not available and the reference chamber is ready.

18. The system of claim 16, further comprising
a data collector coupled with a metrology tool to collect product parameter data and coupled with the processing chamber to collect hardware parameter data and process parameter data.

19. The system of claim 16, further comprising a database having data associated with at least a subset of a PLS model, a PCA model, a PLS-DA model, a batch analysis model, a Taguchi method, response surface methodology, and D-optimization method.

20. The system of claim 16, wherein the VIP module is further operable to select a VIP if a filtering parameter $VIP_{ak}$ is greater than 1, in which the filtering parameter is defined as, $$VIP_{AK} = \sqrt{\sum_{a=1}^{A} (w_{ak}^2 * (SSY_{a-1} - SSY_a)) * \frac{K}{(SSY_a - SSY_A)}}$$

where SSY is a sum of squares of a Y matrix; w is weight of a X variable; a is an index of a principal component; A is a number of principal components; k is an index of the x variable; and K is a number of X variables.

* * * * *